Patented May 10, 1932

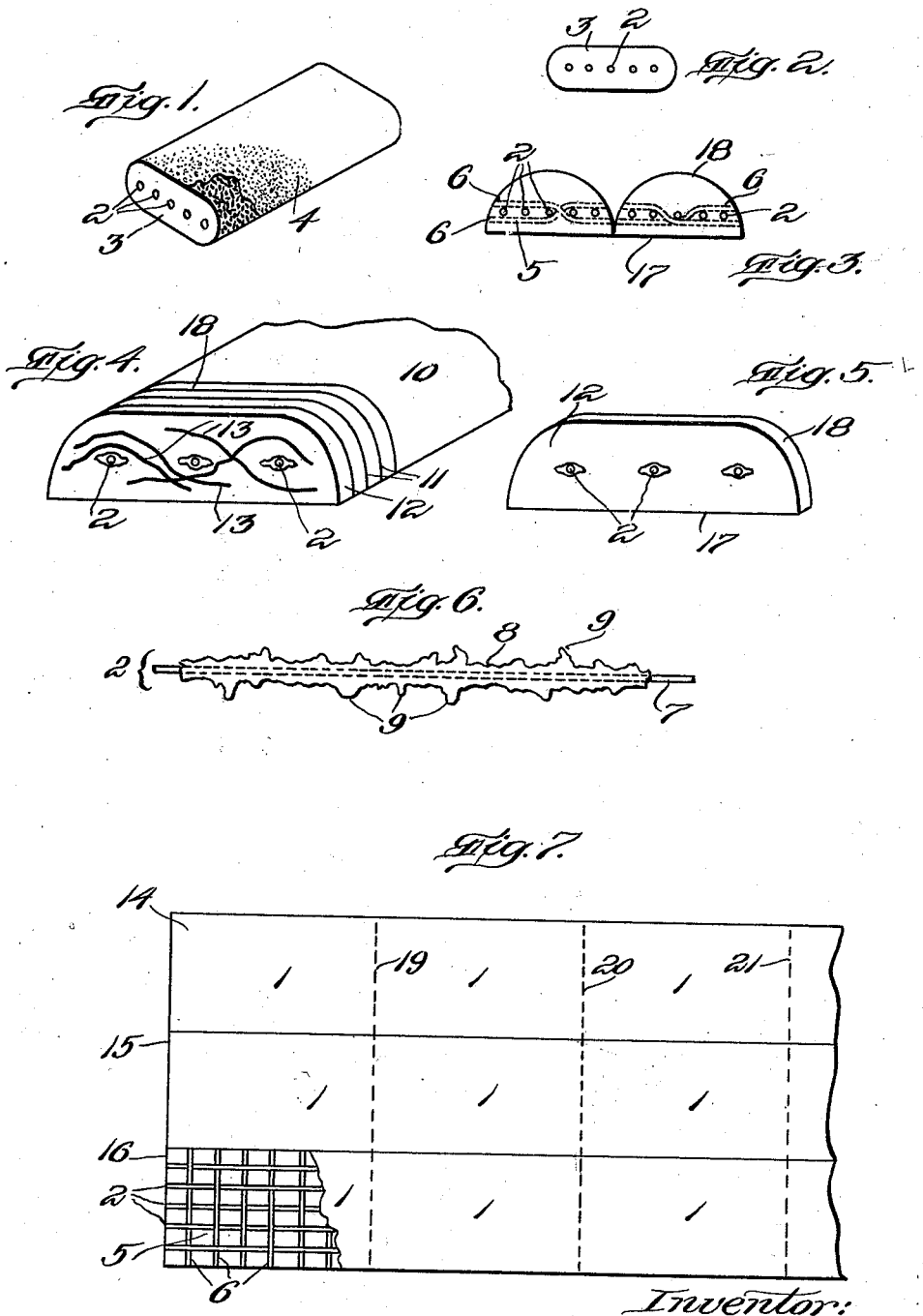

1,857,672

UNITED STATES PATENT OFFICE

ANDREW THOMA, OF CAMBRIDGE, MASSACHUSETTS, ASSIGNOR TO NORTH AMERICAN CHEMICAL COMPANY, OF BOSTON, MASSACHUSETTS, A CORPORATION OF MASSACHUSETTS

SHOE FILLER PIECE

Application filed November 10, 1927. Serial No. 232,279.

My present invention is a shoe-bottom filler made in a compressed or molded, that is to say, shaped piece, but not necessarily parallel sided or flat sided, which is coherent and self-sustaining as a piece or article of manufacture. This is preferably made as a sheet and then cut up or otherwise formed into the small pieces or portions required for the individual shoe-bottoms. Preferably the flat sheet, which is made by the simple well known rolling or sheeting process, is further compressed or molded into a sheet of heaps and furrows or grooves, or into a series of strips or columns which are then at the filler factory cut up or it may be shipped as strips and then cut up at the shoe factory.

The present application is one of a co-pending series relating to this new type of compressed and sheeted filler and its method of use and manufacture in the form of individual filler-pieces. The kind of filler preferably employed is the plastic, heat-responsive, inherently sticky, waterproof, pliable, and normally unchangeable filler of the general kind set forth in my Patents No. 832,002, dated Sept. 25, 1906 and No. 861,555, dated July 30, 1907, which has always heretofore been made and sold in bulk as shown in the former of the above patents, and has commonly been known as "hot filler" because, in use, it has always been necessary, due to its shape and construction, that it should be first melted to a shapeless, mushy condition like thick mortar and applied hot in the shoe-bottom with a hot putty knife or trowel-like tool by spreading the melted mass by a back and forth movement. The present filler-piece series (although the plastic portion of my filler piece is of course not limited to the aforesaid particular kind) is a radical departure in several respects. First and primarily, the filler is applied in the shoe-bottom as a piece, or in other words as a portion of predetermined amount, shape and construction as an article, and applied to the shoe-bottom as such. Second, the filler of the present series is laid cold, that is to say it is laid in the shoe-bottom as a piece of filler as distinguished from being melted and depending upon its melted condition as a necessary preliminary to making it capable of being placed in or applied to a shoe-bottom and as a necessary preliminary for its spreadability and capacity for permanently occupying the shoe-bottom. In saying that it is laid cold I do not mean necessarily that heat or heat treatment is entirely excluded but that it retains its integrity as a piece so that instead of placing an indefinite amount of melted, mushy, shapeless filler in the shoe-bottom according to the judgment of the operator, lifted from a melted mass on a putty knife or trowel or other spoon-like lifting and applying tool, a previously constructed piece of definite, predetermined size or amount is laid in the shoe-bottom intact as said piece. If heat is used in connection therewith it is not such heat as may destroy the piece as such and reduce it to a mushy indefinite mass whose identity as a piece has been lost, but is simply such heat as may be used to quicken the surface of the piece and preferably also to render the entire piece more spreadable while still leaving the piece intact and unchanged as a piece so that it is still capable of being laid in the shoe-bottom as a piece. Within these limitations I call this method "laying cold." In fact, the preferred construction of my present filler piece is such that it is responsive to hot water for quickening its stickiness to enable it more readily and certainly to stay in place immediately when it touches the bottom or other shoe surface on which it is laid. Third, in its preferred and more complete embodiment the filler piece of this series as contained in my other copending applications is laminated and preferably contains a spreadable lamina and a supporting lamina, the latter being external of the former.

The first distinguishing feature of the article constituting the subject matter of the present application is that it is the reverse of the arrangement just mentioned. Its self-sustaining and preferably shape-retaining coherency element or feature is within the mass and the plastic or spreadable element or feature outside of the same, although this particular feature broadly is claimed generically in my application Ser. No. 228,236. The next distinguishing feature is that the piece can be made more roughly or crudely and less artistically. The general layer or sheet, having within it the self-sustaining and tensile-strength giving means is so constructed and composed that it may be readily cut or formed into gobs or little lumps or pieces. As the plastic element is external of the supporting means, the shape of the supporting means no longer controls the molded shape of the piece, as it did in most of the species set forth in my copending applications, and hence the piece of the present application may vary considerably externally and be made more rapidly and with less cost while yet retaining in general the sheet-like, cut-out or molded-piece structure and advantages. The internal support, core, carrier, or self-sustaining element (i. e. the element which provides or it may be supplements the rest of the piece with sufficient tensile strength to maintain it as a piece and prevent disruption and disintegration throughout the period during which it is handled or manipulated as a piece) may be chemical or mechanical. In either case it is so located and constructed within the plastic mass as not to interfere with the spreading of the filler piece into the desired shoe-bottom layer.

While my invention is capable of a wide variety of embodiments, I have illustrated the same herein in certain typical forms which have been found practical and economical. I have referred to it as a gob because said term is expressive and characteristic of the distinguishing chunk-like feature. On the other hand the piece may, if preferred, be made thin and in that case more nearly approaching the width of the shoe-bottom cavity and therefore having a quite limited capacity of expansion in said cavity. But my invention is carried out more fully in a more chunked shape. As the spreadable material is practically all external, (1) it offers much less resistance to pressure and for example to a hot spreading tool (hot primarily to prevent the tool sticking to the piece, as a cold tool would tend to stick and to remove the piece from the cavity instead of leaving it there in place when spread). Because it preferably has no external separate support whatever (such as the outside paper layers of my other species of this series) but consists of the plastic layer which is naturally weak in coherence, I preferably make therefore the piece extra thick, so that (2) it is of a more self-sustaining and stronger shape, the thickness of the material or bulkiness of the piece requiring a corresponding shortening in length or other variation in dimensions to provide the same predetermined amount of filler as in the aforesaid longer, wider, but thinner piece, necessary for filling a given shoe-bottom. As this chunked shape is inherently stronger or more stable because of its bulk, (3) the integrity of the piece is sufficiently maintained by a tenuous supporting or strength-giving layer such as fibrous strings or string-like or strip-like materials within the mass, so arranged that they readily move or flatten out along with the filling material after having served as a base for lending strength, particularly tensile strength, to the sheeting, compressing, and shaping of the filler. Preferably the central or at least internal strength-giving element or lamina is so arranged as to give lateral strength, but primarily it provides lengthwise strength as by means of the strings, or cords, just mentioned, to facilitate (4) making the filler element first in the form of long strips or narrow columns side by side in the sheet. Making the finished product without any outer supporting layer has many advantages. (5) The entire strip and later segregated portions or chunks consist of filler material unadulterated or interfered with by covering supports such as paper which constitute a necessary nuisance in my other species so far as relates to their presence in the shoe-bottom cavity. The further advantage of having the filler material without an outer supporting layer of fabric such as paper or the like sheet covering is, (6) that all waste is eliminated, as every particle of the filler material is simply rolled or pressed down and forward until utilized in the actual filler pieces by being pressed around the tensile-strength giving elements extending lengthwise of the columns or strips being molded and shaped under pressure as stated. This is of decided practical value as it eliminates all necessity of cutting cover material or trimming the parts, losing edge portions and the like. This structure is such that any edge portions of the sheet being molded, which may fail to get into the edge columns or strips, are wholly usable over again in molding the next sheet, because consisting of clear filler material unmixed with cover material or the like (as in my other species aforesaid). As the filler material is external and therefore more easily spreadable it follows, (7), that the strips are more readily hacked or otherwise severed into the small chunks or individual shoe filling pieces to a given size to correspond to the proportionate thin, flatter filler piece of my other species. In other words, instead of requiring a considerable process for making the double-trapezoid or other special polygonal shapes of my other species of this series of applications, this provision of the relatively thick mass of clear filler material wholly external of the center layer, if any, as practically constituting the entire piece, makes it feasible simply to chop up or hack out rapidly, with exceedingly slight expense, labor and apparatus, the final piece, but of definite proportions or amounts of filler. Besides the above six advantages of this construction, two further principal advantages result therefrom in connection with the heat treatment mentioned, such as immersion of the filler piece in hot water. Such immersion and heat treatment is set forth in my method application Ser. No. 228,588, filed October 25, 1927. When the pieces are thin, as for instance in the other species of this series of applications, the piece cannot be subjected to heat or immersion to much extent without going to pieces, but, (8), by my present invention the immersion of the piece in hot water may not only be somewhat prolonged and hence need not be watched or so carefully guarded, but the immersion or other dry heat or other hot or cold liquid treatment may become highly beneficial to the chunk as a whole on account of the possibility of greater saturation or penetration taking place, (instead of being restricted to the surface quickening, as in said other species) and this (9) greatly facilitates and simplifies the spreading of the filler piece in the shoe-bottom as well as the subsequent levelling operation. The initial thickness of the filler piece when first put into the shoe-bottom makes it preferable to spread the filler layer, at least to a preliminary extent, prior to the laying of the outer sole and the levelling operation, and this spreading operation is preferably accomplished by a hot roll (as set forth in my method application Ser. No. 228,588), with the various attendant additional advantages set forth and claimed in said method application. (10) Cleanness or neatness as to the shoe itself results from my invention. In the former hot-filler method the operator was not only apt to drop a few grains of the filler on the upper but as the whole laying of the filler took place when the filler had no coherency but was melted and freely plastic and movable, it usually happened that a little of the filler was pushed or dragged over onto the upper. In case of a McKay shoe where the upper is in tight pleats or folds extending to and forming the edge of the cavity, it would be very difficult to remove any spilled granular filler from these folds. By having the filler in a piece with no loose or disintegrated filler whatever, this danger to the shoe and delay of the operator is entirely eliminated. Therefore by providing a filler piece of the exact predetermined amount of spreadable filler material held together as a piece, a complete as well as clean job is assured. The quantity necessary to do the work is nicely taken care of without the exercise of any judgment on the part of the operator, so that the work is accurate, speedy and clean. Also, one embodiment of my invention hereinafter more fully set forth is particularly adapted to this small special kind of work such as ladies' McKay shoes. (11) In filling McKay shoes of certain types especially ladies' shoes, the cavity to be filled is particularly small, as the surrounding folded-over edge-portions of the upper leather and lining act to close in the opening even more than its naturally small size, so that it would be a very difficult matter for the operator to estimate just how much filler, of the mushy, shapeless, melted kind, he should dip up with his spatula or putty knife to plaster into the cavity. This is all taken care of correctly and automatically by my present filler-piece.

In the drawings,

Fig. 1 is a perspective view of one embodiment of my new filler piece;

Figs. 2 and 3 are views in end elevation of other forms and embodiments;

Fig. 4 is a perspective view of a strip of filler especially adapted for very small work such as ladies' shoes;

Fig. 5 is a perspective view of an individual piece cut from the strip of Fig. 4;

Fig. 6 illustrates one form of chemical strengthener or internal support; and

Fig. 7 is a top plan view of a sheet, but only partially formed into separate gobs or chunk-like pieces.

The object of this invention is to obviate the manufacturing expense and simplify the manner of use and the cost of materials by eliminating the external paper layers or other supporting covers of my other species previously mentioned, and yet make the filler piece entirely self-sustaining, coherent and durable for transportation and handling, and capable of being used at the shoe factory without melting but held so coherent as to be laid in the shoe-bottom as a piece, and then spread by pressure in any of the ways mentioned in connection with the more elaborate and expensive filler pieces just mentioned of my other copending applications in which the spreadable layer is preferably at the center or within external supporting layers. In several of its features it is subordinate to my copending application Ser. No. 228,236 filed October 24, 1927, such as in having external spreadable filler material, in having a pad-like outside or mass of spreadable filler material entirely surrounding a tensile giving or strengthening internal element, and in eliminating a outside supporting layer or layers; and in many of its still broader features it is subordinate to my copending applications Ser. No. 133,506 filed September 3, 1926 and Ser. No. 183,302 filed April 13, 1927.

Preferably I provide at the center of the piece 1 a supporting medium which preferably consists of coarse or at least rough fibrous strings 2. These strings are stretched lengthwise of the piece 1 so as to give tensile strength for subsequent strip formation and supporting integrity in the process of manufacture as well as in the finished articles, and are surrounded by the spreadable body material 3 of the character described in my aforesaid patents. An external coating 4 is provided (of any of the granular, powdery or non-sheet varieties of my application Ser. No. 183,302 filed April 13, 1927) capable of maintaining the outside of the piece substantially nonsticky and dry for packing, transportation and handling. This outside coating preferably consists of fine cork rolled or pressed into the exterior of the sticky mass 3 in amount sufficient to make said surface substantially dry, and also preferably in amount sufficient to cooperate, in the subsequent rolling or strip-forming operation, in maintaining the exterior practically dry even though the strip-forming process changes one or both surfaces from a strictly level sheet to a corrugated sheet or rounded strip form as shown in the drawings. Preferably the fine cork or other comminuted material has mixed with it powdered soapstone, talc or other inert powder to constitute a smoother finish for the article of manufacture or it may contain powdered starch, dextrine or the like for the same purpose, then having the added function of aiding in the laying and sticking of the piece in the shoe-bottom when the time comes to use the piece as a filler. In other words, I provide a filler piece which does not contain a covering support, or supporting layer as in my copending applications 133,506, 183,302, 192,076, filed August 6, 1927, and 211,157, filed August 6, 1927, but simply has its outside dulled with a comminuted or powdery material to render the binder of the filler mass 3 innocuous and preferably also to stiffen the outer surface of the main filler material. Thus the outer surface of the piece has a thick coating or dusting of finely powdered cork, cotton linters, mica flakes, talc, chalk, leather dust or the like, or mixtures thereof, or mixtures of any such substances with stiffening materials which tend to set under the action of heat, moisture, or pressure, such for example as plaster of Paris, pulverized glue, pulverized dextrine, starch, flour or inert mineral matter etc., or solutions of certain of such stiffening substances such as glue, paste forming substances, or the like. Or this outside coating may be of a kind to be easily washed off, or disposed of, or dissolved by water or chemically, as for example cellulose or wood pulp. Preferably the dry cork has mingled with it a normally dry adhesive such as dextrine for example capable of being moistened just prior to being laid in the shoe-bottom cavity. This is rolled in or permanently incorporated as a surface protector for purposes of handling, transportation etc. so as to prevent the pieces from being externally sticky and yet leaving the pieces in condition to be rendered instantly sticky either simply by being spread so as to sever and break up the external coating or by being dipped in water, preferably hot water, just as the piece is to be placed in the shoe-bottom. Or the piece may have any of the other surfaces of this general kind mentioned and claimed in the above applications, particularly in my application Ser. No. 183,302, filed April 13, 1927. When the piece thus coated is subjected to pressure, it spreads without difficulty so as to fill the cavity of the shoe-bottom, and as such coating layers comprise substances, for example, plaster of Paris mentioned, which harden when subjected to moisture, the moisture of the dipping process or of the tempered shoe parts will react with such substances, thus tending ultimately to stiffen and harden the filler after its application to the shoe-bottom. Instead of simple fibrous strings 2 a reticulated fabric 5, such as burlap, or other coarse or loosely woven fabric, may be used or in fact any of the self-sustaining, tensile-strength giving layers mentioned in my copending applications, particularly the one last designated above. However, as the preferred chunklike or thick-shaped form of my piece necessitates greater lateral spreading movement in the shoe-bottom in order to get the filler piece in to the thin, properly laid filler layer, than in the case of those species of my general invention which are made thin originally as articles of manufacture (as contained in my aforesaid other copending applications), this central or internal tensile-strength giving element 5 preferably has its crosswise members 6, such as cords or strings, free to shift laterally with relation to the lengthwise members 2 so as not to interfere with the entire freedom of spreading movement of the piece. To this end the crosswise elements 6 are arranged either wholly parallel and separate or mainly separate from the lengthwise elements 2 as shown in Figs. 3 and 4 in a plurality of planes. Broadly stated this novelty of my filler piece resides in providing the spreadable body material outside and the supporting or strength-giving element on the inside. The strength-giving element however need not be in the form of a piece, layer, fabric or the like, but may be chemical such as mucilaginous, gluey, binding mediums imparting tenacity, etc. which provide a sufficiently stiffer structure by cohesion for maintaining the piece self-supporting, coherent and sufficiently stable for handling and to be placed in the shoe-bottom as a piece and yet break down or disappear under pressure or under the process of dipping in hot water or subjection to other special treatment for the purpose at the time of use. For instance in Fig. 6 I have shown a form of string-like support or tenuous strengthener 2 consisting of a central thread 7 dipped in or otherwise coated with glue, or any mucilaginous substance to make a supporting medium of sufficient bulk and strength for the purpose, the said coating being indicated at 8 and shown as having rough places or projections 9 formed by the solidified drippings of the substance in which the thread was dipped when said substance was molten or liquid. The cord or lengthwise internal strength giving medium may be of any substance for providing longitudinal strength and resistance against lengthwise or separating movement of the granular or spreadable mass 3, such as strips of fabric, paper, twine or any striplike material, preferably such as to be capable of readily being cut, severed, broken or ruptured in any way for the severing of the long strip into short pieces. This central string 2 in such embodiments as Figs. 1, 2 and 3 is mainly necessary only for the handling, making, and cutting of the filler material, because as soon as the latter is cut into slabs or small pieces the bulky shape of the piece gives enough or almost enough strength and coherence. In Figs. 4 and 5 I have shown a form of piece adapted to the smallest kind of women's shoes, even of the smallest kind of such shoes when made by the McKay process, and have indicated in Fig. 4 a long strip or column 10 of molded filler containing a series of strings 2 like the ones shown in Fig. 6 or strips of twisted paper or other string-like longitudinal strengtheners, and have indicated lines of cleavage 11 for cutting off individual pieces 12, one of which is shown in Fig. 5. The piece shown in Fig. 1 is large and intended for a man's shoe for example, whereas it will be seen that the piece shown in Fig. 5 is exceedingly small as for a woman's shoe and yet wholly intact as a piece. In mixing the plastic, melted filler material originally, prior to molding it into the strip form, I preferably introduce strengthening elements as for instance loose fibres 13 which are thoroughly mixed in and throughout the mass with the result that they imbed and interlock more or less throughout the strip as indicated in Fig. 4. These strengtheners 13 are primarily intended for thin and very small pieces. The main functioning of the strength giving cord or cords 2 is for the purpose of manufacture as it makes it feasible to run the plastic filler in strip form or lengths notwithstanding the otherwise very unmanageable granulated mass of the plastic filler material. Once the mass has been molded and cooled, and particularly after being dusted and compressed, it is no longer difficult to compact it to a more stable consistency for cutting and handling. After the material is dusted with dry powdered cork etc. as already stated to overcome the stickiness of the stripped material it is preferably again compacted so as to press the dry powder onto and into the surface and when finally the filler pieces are cut from it they are subjected to a further dusting with soapstone or dulling powders to prevent them from striking together, especially at their severed ends.

In Fig. 7 I have illustrated in a general way the aforesaid manufacture of my piece. Preferably, the plastic body material is sheeted, to such thickness as desired, with the supporting elements 2, 5, 6, 7, 8, 9, 13 or whatever the internal or central strengtheners may be, therein, and then this sheet is heavily coated with the loose, dry surfacing material or materials 4 which are rolled in sufficiently to make a crust or coating that is durable enough for the manufacturing manipulation and preferably for the subsequent handling and transportation. Then, or at least at some stage in the manufacture, the whole sheet of filler material is further or sufficiently condensed or compressed (and preferably molded) so that it will no longer be externally sticky or open, fragmentary or separable in any respect. This rolling or pressing and shaping may be by running the sheet between opposite circumferentially fluted rollers to produce the columns or strips 14, 15, 16, shaped in cross section as shown in Figs. 1 and 2, or between a lower cylindrical roller and an upper fluted roller to produce the flat bottom 17 and the upper curved surface 18 of Figs. 3–5. Having shaped the sheet thus in columns or strips 14, 15, 16 (of any cross sectional shape desired), these are cut transversely along the lines 19, 20, 21 to form the individual pieces 1 or 12. Preferably the pieces are covered with a skin of waxy anti-squeak material, such as paraffin amenable to the hot-roll treatment hereinafter set forth and described in my said application Serial No. 228,588, filed October 28, 1927. I have used the word gob as the most descriptive of that feature which from a practical standpoint is very advantageous in not being obliged to have a special or unvarying shape to the padlike piece. It will be understood that my invention aims to bring this plastic filler within such low cost as to enable the makers of the very cheap shoes to use the same,—a result not heretofore thought possible. Accordingly my invention makes it feasible to shape the pieces thick or thin, wide or narrow, regular or irregular, the ultimate object being simply to deliver to the shoe manufacturer the filler either already cut into small chunks or pieces each adapted to fill a single shoe-bottom, or in a sheet or in a strip so that the shoe manufacturer can cut it up or chop it himself into the desired small pieces each capable of being handled and placed in the shoe-bottom as a piece, thereby doing away with all the expensive machinery and expensive process heretofore necessary. When thus made (the shapes in the drawings being given as typical of the general chunklike or pad-like forms preferred) the pressing or spreading of the filler in the shoe-bottom preferably takes place before the sole laying. The piece as already described is specially constructed to facilitate this spreading. Having formed the same as described, the pieces are dipped or immersed in hot water, or subjected in any way to copious moisture, preferably hot, or to heat, as their nature makes advisable, sufficient to quicken the sticky surfacing or outside coating and preferably so as also materially to soften the filler mass itself but of course not with a disintegrating saturation, and then a piece is laid in the shoe-bottom first being chopped off as just explained into a chunk, if still in strip form, and pressed in place. For instance, suppose a piece such as in Fig. 1 is thus laid in place, a hot roll is passed over the same with sufficient pressure to spread the piece to the confines of the shoe-bottom cavity. The roll is engaged with the piece, or the piece with the roll, at the middle of the piece and moved towards one end of the piece and then re-engaged at the middle and moved towards the other end of the piece, this method insuring quick spreading without tendency to shift the piece improperly at the start. Also preferably the roll is larger at the center or tapered from the center toward its ends, so as not only to give a lengthwise spreading effect but simultaneously a widthwise spreading effect. This rolling from the middle to one end of the piece and then from the middle towards the other end is especially effective in case the plastic filler piece has a sticky, slippery underside such as is the case when the coating surfacing contains dextrine or other latent slippery adhesive or when the body material 3 contains such latent adhesive quickened by the hot water treatment. Starting the pressure of the roll at the transverse middle of the filler piece sticks the piece in place before it has an opportunity to shift, whereas simply rolling it lengthwise from one end to the other tends to shove the piece ahead of the roll. By bringing extra pressure along the longitudinal middle as by the double-cone shape the piece is aligned lengthwise as well as causing a lateral spreading of the plastic portion, and it is especially anchored along the lengthwise center against shifting prior to receiving the outer sole. Also the strand kind of internal tensile strength-giving means shown in the drawings facilitates the spreading because the fibrous strands not only permit the sticky plastic filler mass to move beyond or lengthwise of said strands but the strands themselves, not being bound or interlocked with each other are free to shift either regularly or at random in the spreading layer of filler in the shoe-bottom. And while they do not disappear, they flatten out or stow themselves away automatically under the spreading movement without offering any substantial resistance, especially when the piece has been softened by heat or other special treatment or by its own inherent components influenced by the pressure process. The process of rolling, as just described, forms part of the subject matter of my copending application Ser. No. 242,085, filed December 23, 1927.

While I prefer to form the individual small pieces as articles of manufacture to be shipped ready-made to the shoe manufacturer, it will be understood that the material may be shipped in the strip form 10, 14, 15, 16, or in any other convenient form or large piece. In any event, the operator takes a cut-up, small, individual piece, either with his fingers or with a spoon-like holder, and dips it in the hot water, then places the piece thereby in the shoe-bottom and, if preferred, simply reverses the spoon and uses the bottom side as the levelling tool. I mention this to show how inexpensive and practicable this form of filler is. In order that my invention, in the form of a relatively thick chunk-like compressed and self-sustaining piece of filler material, even without any internal tensile-strength giving element, may be clearly apprehended and distinguished from previous plastic shoe fillers, I refer to my Patent No. 1,510,238 of Sept. 30, 1924, by way of comparison and illustration. In said patent the filler material is made in small fragments, non-compressed, open, and in permanent fragmentary condition even when inevitably mixed in the course of transportation. This fragmentary condition is of a haphazard nature so far as amount of filler and shape of fragment are concerned. The object is to insure quick heat penetration. This object is the reason for the fragmentary shape and for the essential non-compressed and open character of the filler itself. This is directly opposite from the character, construction and purpose of the filler piece of my present invention. The filler is not open but condensed and instead of being non-compressed is sufficiently compacted to render the pieces self-sustaining and capable of transportation as pieces and of maintaining their integrity and individuality to the time of their application in the shoe-bottom. Even though a heat treatment such as immersion in hot water is employed, the pieces are spread in the shoe-bottom cavity cold in the sense that the filler is not melted or subjected to a heat process rendering it mushy so as to require spreading like mortar in indefinite or varying portions as picked up by a trowel from a melting pot or melted-mass container. If heat treatment is employed in connection with my present novel filler piece, it is simply for facilitating the quickening of the adhesive and the application of the piece to the shoe in the form of a piece, self-sufficient and of a predetermined amount, all as set forth in my original application 133,506 and the subsequent filler piece applications already mentioned above.

As will be apparent from the foregoing description, the tenuous, string-like, separated, internal, strengthener feature of my invention is capable of a wide range of embodiments and materials and likewise the strip-like form of molded columns of filler are capable of a great variety of shapes and relations, all within the spirit and scope of my invention, and accordingly I wish it understood that I intend the same to be covered broadly herein as well as specifically in the various claims.

What I claim is,

1. An article of manufacture comprising, a sheeted layer of spreadable shoe-filler material of condensed compacted form, having embedded therein strength giving string-like means for aiding lengthwise coherency of the layer.

2. An article of manufacture comprising, a sheeted layer of spreadable shoe-filler material, having embedded therein strength giving string-like means for aiding lengthwise coherency of the layer, and said sheet being molded and compressed into condensed, columnar strips.

3. A shoe-filler piece, comprising a mass of spreadable filler material, and internal tenuous elements for giving tensile-strength to the mass, united in a dense, compact, self-sustaining, coherent and adherent piece for handling and use.

4. A shoe-filler piece, comprising adhesive spreadable filler material, and internal tensile-strength giving means in a plurality of planes capable of relatively shifting under pressure, united in a condensed pad-like, self-sustaining, coherent piece for handling and use.

5. A shoe-filler piece, consisting of spreadable filler material and string-like elements intermingled in strength giving and stability giving relation, said filler material being compressed about the string-like elements, and the whole united in a pad-like, self-sustaining, coherent piece for handling and spreadable in use.

6. A shoe-filler piece, comprising spreadable filler material laminated with string-like internal elements molded and compressed in a pad-like, self-sustained, coherent piece for handling and use.

7. A shoe-filler piece, comprising spreadable filler material, and an internal open, fibrous layer, molded and compressed together, said spreadable material united through at least some of the openings in said fibrous layer, and the whole having a pad-like shape as a self-sustaining, coherent piece for handling and use.

8. A shoe-filler piece comprising adhesive, spreadable, filler material and an internal strength-giving element of burlap, the spreadable filler material being molded and compressed upon both sides of the burlap and being united through the openings in the burlap, the whole constituting a pad-like, self-sustaining, coherent piece for handling and use.

Signed by me at Boston, Massachusetts, this ninth day of November, 1927.

ANDREW THOMA.